Aug. 14, 1928.
R. A. ASHTON
1,680,838
TOOL CARRIAGE AND SLIDE FOR MACHINE TOOLS
Filed March 18, 1926
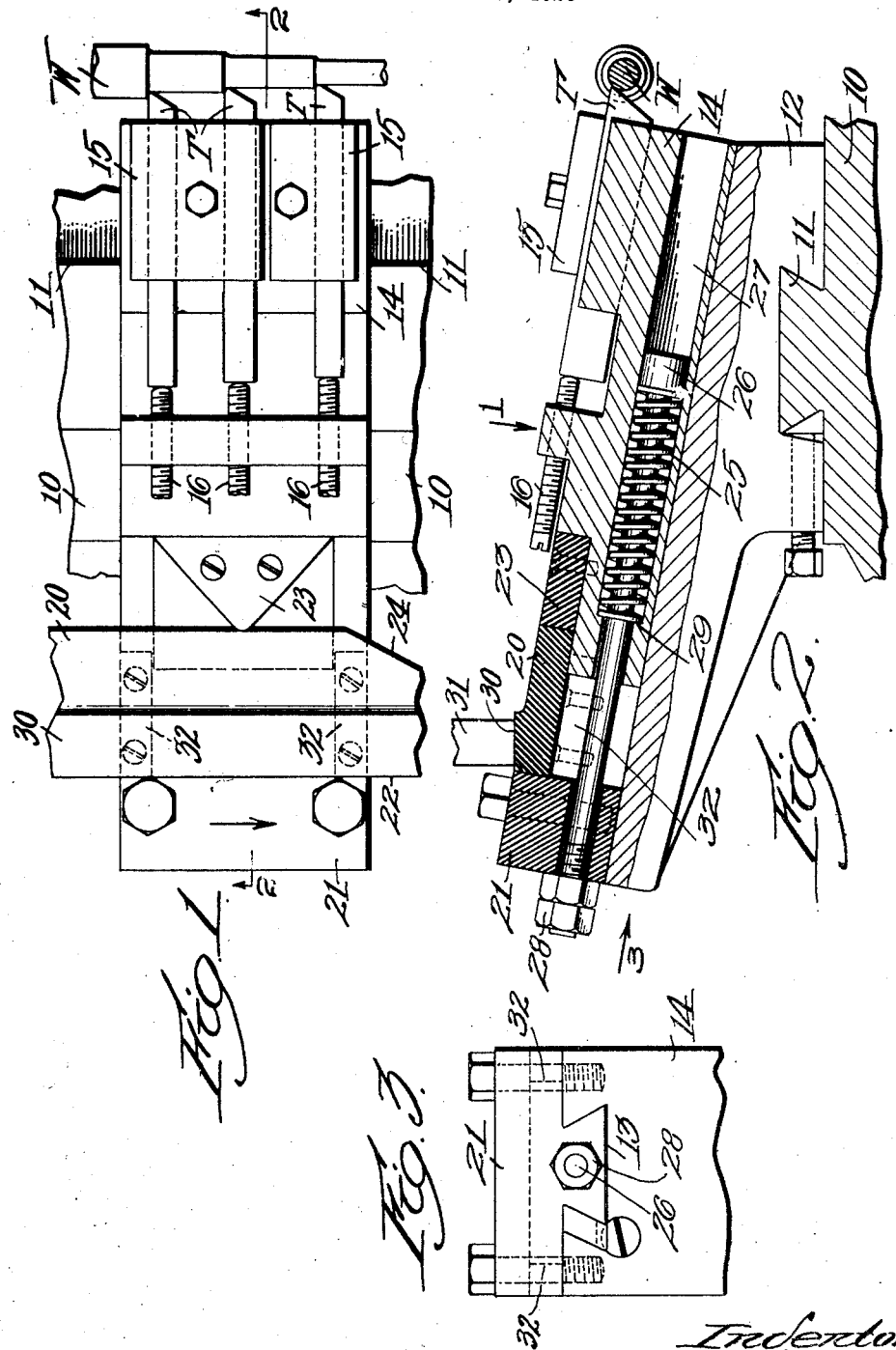
Inventor
Richard A. Ashton
By Attorneys
Southgate Fay & Hawley Patented Aug. 14, 1928.

1,680,838

UNITED STATES PATENT OFFICE.

RICHARD A. ASHTON, OF SENECA FALLS, NEW YORK, ASSIGNOR TO SENECA FALLS MACHINE CO., OF SENECA FALLS, NEW YORK, A CORPORATION OF MASSACHUSETTS.

TOOL CARRIAGE AND SLIDE FOR MACHINE TOOLS.

Application filed March 18, 1926. Serial No. 95,778.

This invention relates to a tool carriage and slide for an engine lathe or other similar machine tool, and more particularly to a tool carriage and slide which are movable axially of the machine during the operation thereof. Such a tool slide commonly provides support for a plurality of cutting or turning tools.

It is the object of my invention to improve the construction of such a tool carriage and slide, making them more economical to manufacture and particularly effective in operation. With this general object in view, important features of my invention relate to the provision of improved templet means for positively advancing the tools towards the work, to the provision of an improved spring tension device for withdrawing the tool from the work and to certain arrangements and combinations of parts which will be hereinafter described and more particularly pointed out in the appended claims.

A preferred form of the invention is shown in the drawings, in which

Fig. 1 is a plan view of certain parts of a machine tool showing my improved construction, Fig. 2 is a sectional elevation thereof, taken along the line 2—2 in Fig. 1, and Fig. 3 is a front elevation looking in the direction 3 in Fig. 2.

Referring to the drawings, I have shown a portion of a casing or frame 10 having guideways 11 for a tool carriage 12 which is movable axially of the machine by any suitable driving mechanism (not shown). The carriage 12 is provided with guideways 13 for a tool slide 14 on which a suitable turning or cutting tool T is secured by a clamp 15. The tool T may be adjusted longitudinally in the slide by an adjusting screw 16. Preferably a plurality of tools T are mounted on the slide 14 and two or more clamping plates 15 and adjusting screws 16 are provided.

A templet bar 20 is secured to the base or frame of the machine, and is held from axial movement therein. A bearing block or member 21 is fixed to the carriage 12 and provides a support for the straight face 22 of the templet bar.

A templet block 23 is secured to the slide 14 and engages the cam face 24 of the templet bar 20.

A tension spring 25 is mounted on a headed bolt 26 within a recess 27 in the tool slide 14. The bolt 26 extends through the block 21 and is provided with adjusting lock nuts 28, by which the pressure of the spring 25 may be adjusted.

The spring is disposed between the head of the bolt 26 and a shoulder 29 in the recess 27 of the slide. The spring thus acts to draw the tool slide 14 yieldingly away from the work W and causes the templet block 23 to engage the cam face 24 of the templet bar 20.

The templet bar is provided with a raised and substantially horizontal portion 30 and is pressed downwards by a fixed support 31, which prevents upward displacement of the templet bar during the operation of the machine. Blocks 32 may be provided at the opposite edges of the tool carriage 12 to support the templet bar as it slides relatively to the tool carriage.

Having described the details of construction of my improved tool carriage and slide, the method of operation thereof will be readily apparent. As the tool carriage is moved axially of the work on its guide way 11, the templet block 23 is moved along the cam face 24 of the templet bar 20, which causes a transverse movement of the tool T towards and from the work. The tool is advanced positively by the cooperation of the templet bar and templet block, and is withdrawn from the work by the spring 25. As the carriage moves axially, the bearing block 21 of the carriage provides a bearing or support for the templet bar and resists the pressure of the spring 25, and of the work.

I have thus provided a very simple mechanism by which one or more turning or cutting tools may be advanced and retracted as desired and by which these movements may be very easily varied, simply by changing the templet bar to provide any desired operation.

Having thus described my invention, and the advantages thereof, I do not wish to be limited to the details herein disclosed, otherwise than as set forth in the claims, but what I claim is:—

1. In a machine tool, a frame, a tool carriage slidable along said frame, a tool slide mounted on said carriage, a templet bar fixed to said frame, a templet block on said tool slide engaging a cam face of said templet bar to move said tool slide towards the work, means to yieldingly move said tool slide from the work and to hold said templet block against said templet bar, said slide having a recess therein and said yielding means comprising a headed rod fixed in said carriage and having its headed end received in said recess, and a spring encircling said rod and compressed between the head of said rod and a shoulder in said recess.

2. In a machine tool, a frame, a tool carriage slidable along said frame, a tool slide mounted on said carriage, a templet bar fixed to said frame, a templet block on said tool slide engaging a cam face of said templet bar to move said tool slide towards the work, means to yieldingly move said tool slide from the work and to hold said templet block against said templet bar, said slide having a recess therein and said yielding means comprising a headed rod fixed in said carriage and having its headed end received in said recess, and a spring encircling said rod and compressed between the head of said rod and a shoulder in said recess, said tool slide having provision for holding a plurality of tools thereon, and having separate means for adjusting each tool towards and from the work.

3. In a machine tool, a frame, a tool carriage slidable along said frame, a tool slide mounted on said carriage, a templet bar fixed to said frame, a templet block on said tool slide engaging a cam face of said templet bar to move said tool slide towards the work, means to yieldingly move said tool slide from the work and to hold said templet block against said templet bar, said slide having a recess therein and said yielding means comprising a headed rod fixed in said carriage and having its headed end received in said recess, and a spring encircling said rod and compressed between the head of said rod and a shoulder in said recess, said templet bar being supported in inclined position but having a horizontal upper portion, and a holding device for said templet bar engaging said horizontal portion.

In testimony whereof I have hereunto affixed my signature.

RICHARD A. ASHTON.